E. G. JOHANSON.
CHANGE MAKING MACHINE.
APPLICATION FILED JAN. 10, 1918.
1,318,762.
Patented Oct. 14, 1919.
11 SHEETS—SHEET 1.
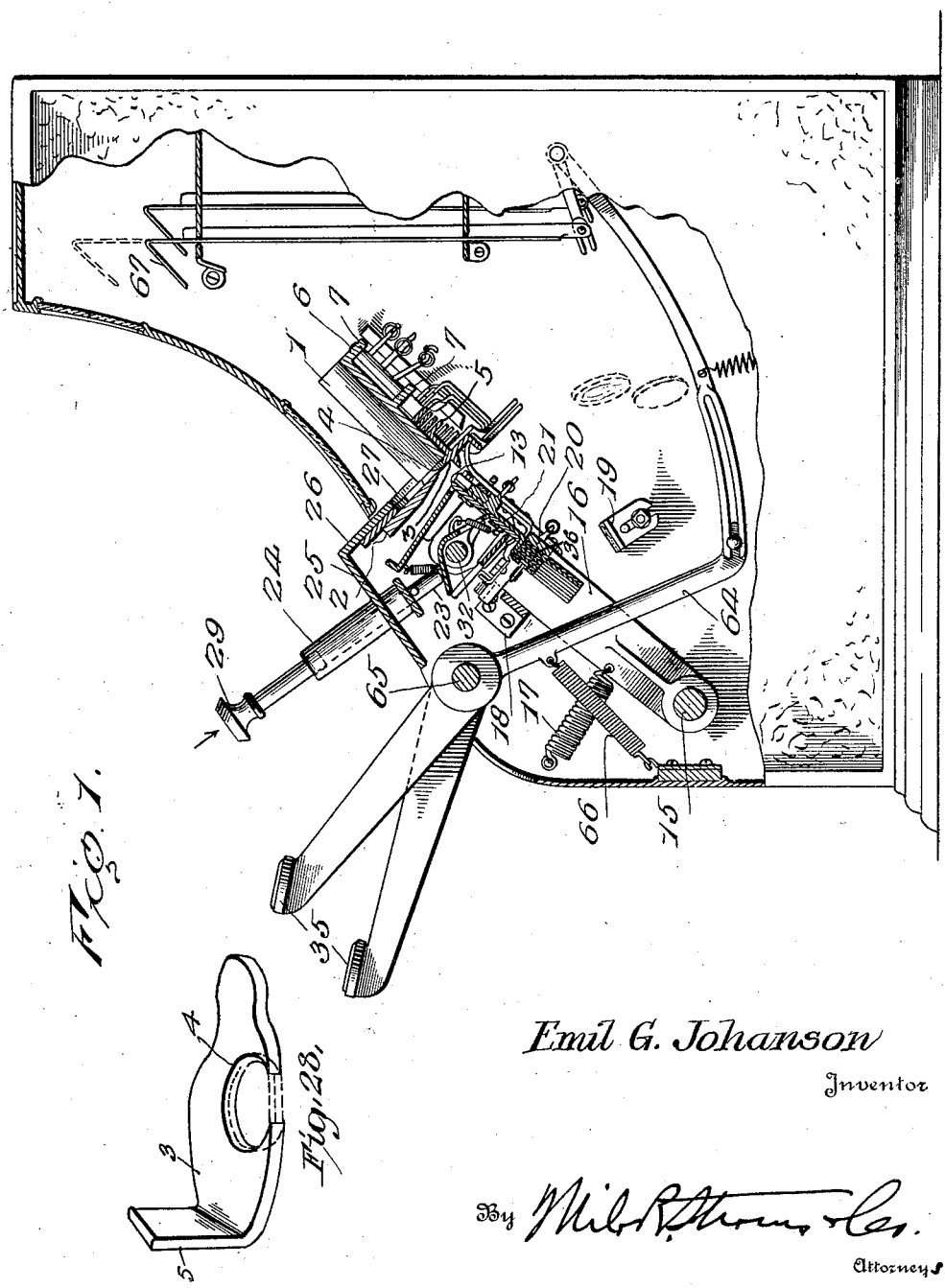
Emil G. Johanson
Inventor E. G. JOHANSON.
CHANGE MAKING MACHINE.
APPLICATION FILED JAN. 10, 1918.
1,318,762.
Patented Oct. 14, 1919.
11 SHEETS—SHEET 2.
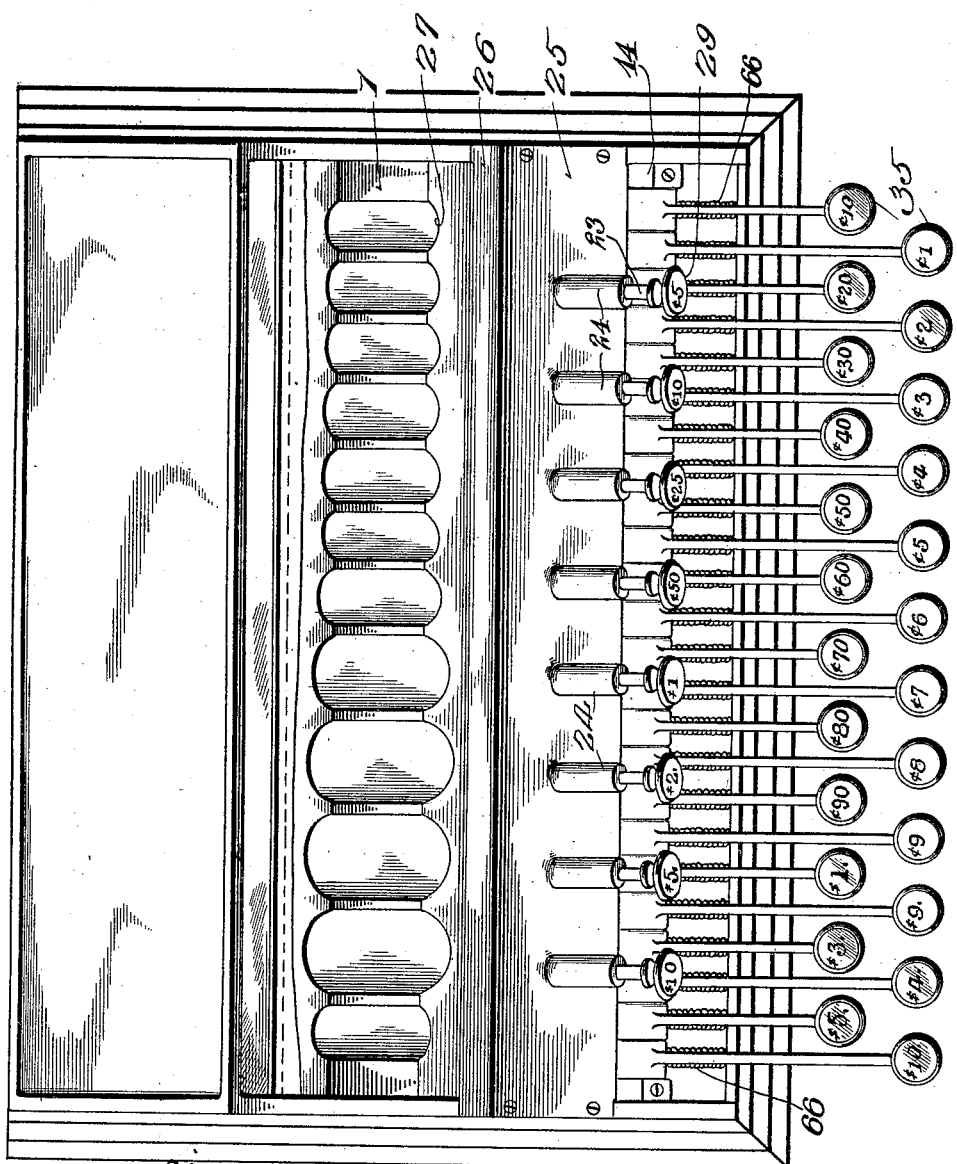
Emil G. Johanson
Inventor.

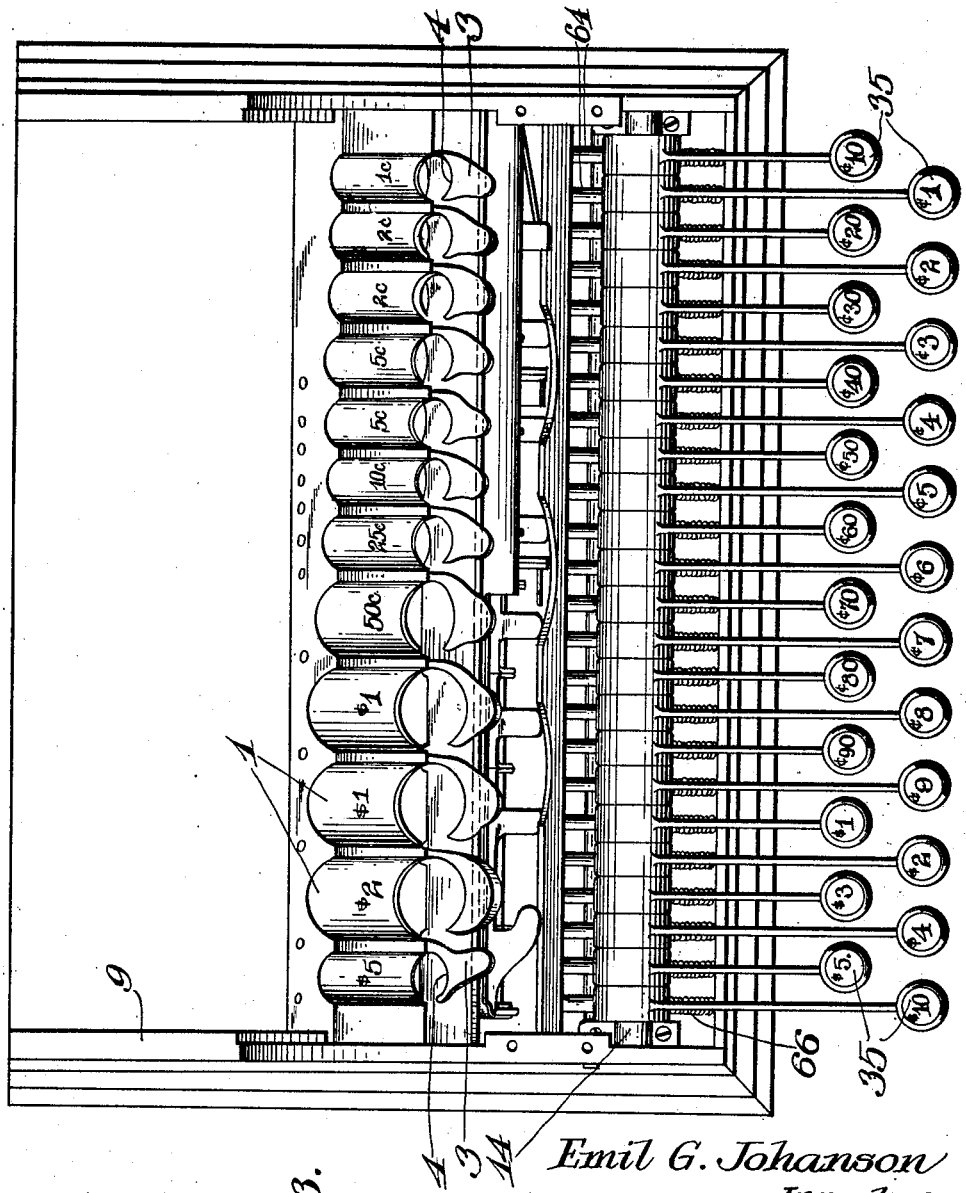

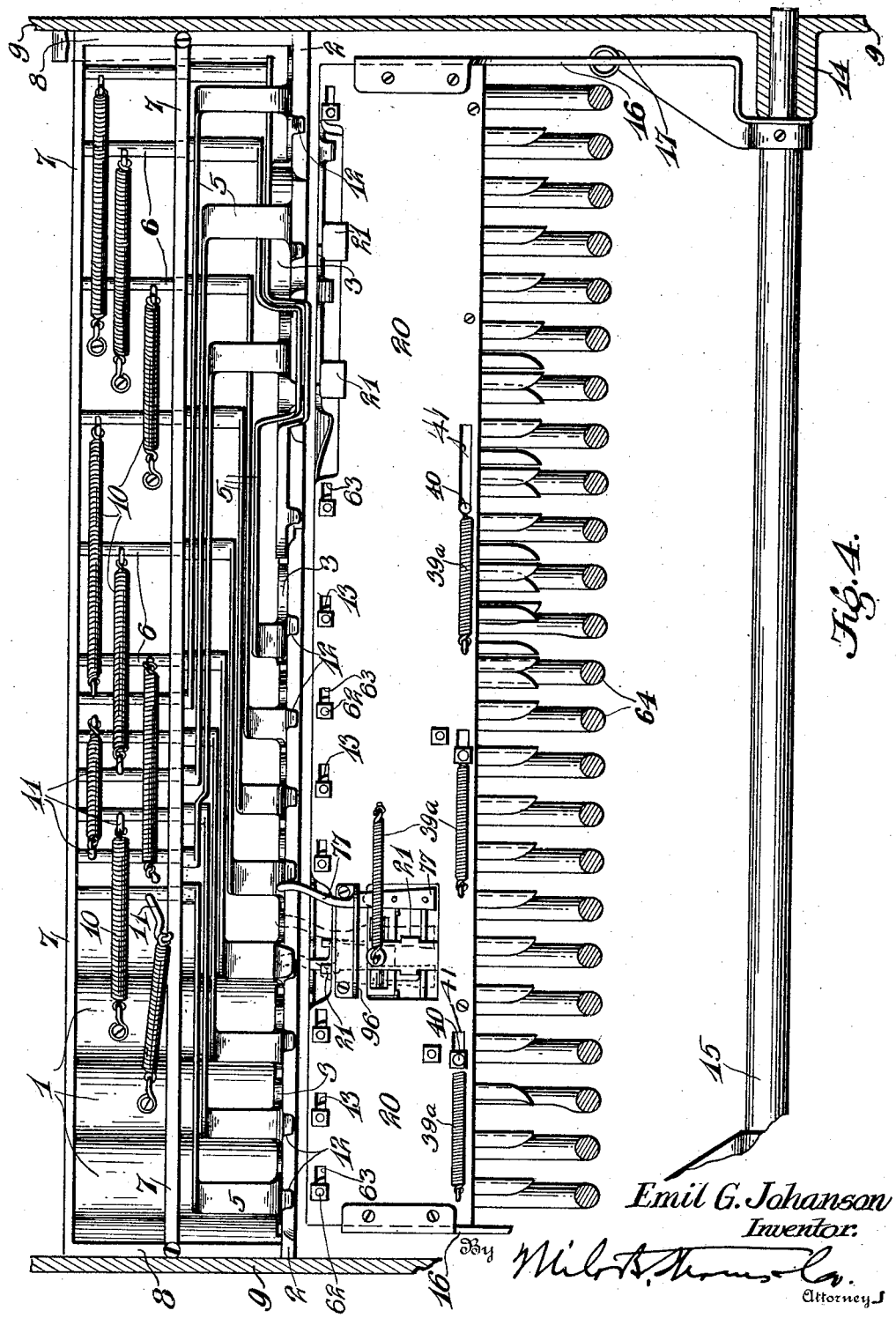

E. G. JOHANSON.
CHANGE MAKING MACHINE.
APPLICATION FILED JAN. 10, 1918.
1,318,762.
Patented Oct. 14, 1919.
11 SHEETS—SHEET 5.
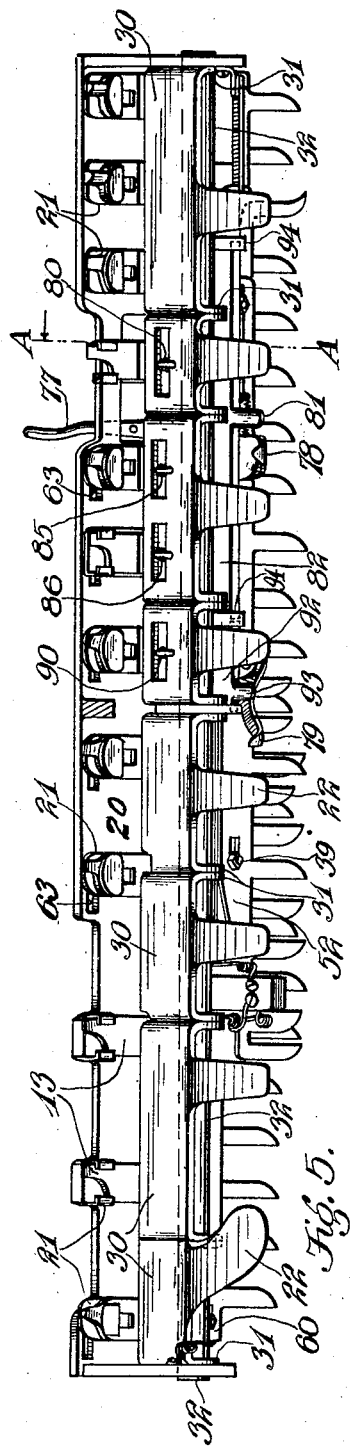
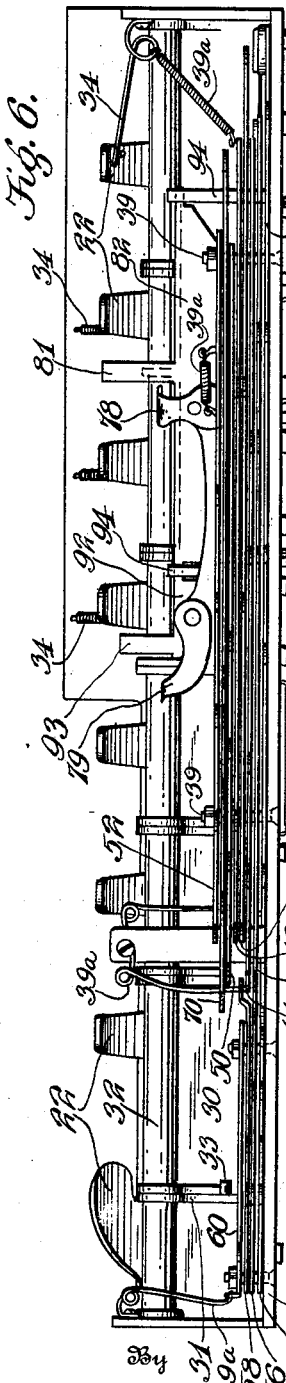
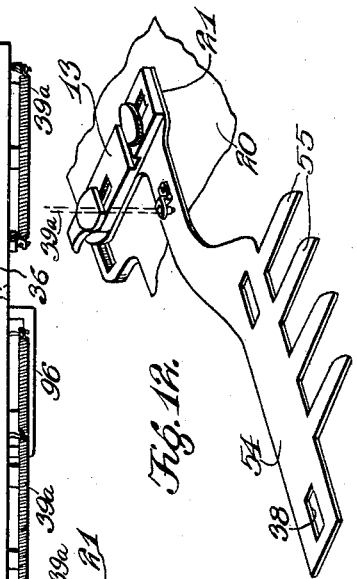
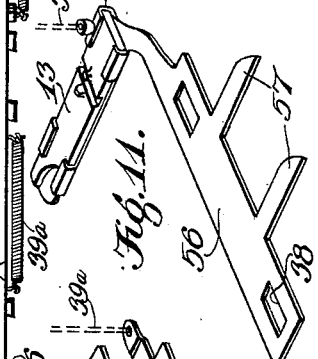
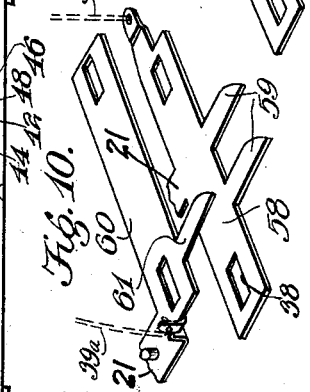
Emil G. Johanson
Inventor.
By
Attorneys.

E. G. JOHANSON.
CHANGE MAKING MACHINE.
APPLICATION FILED JAN. 10, 1918.
1,318,762.
Patented Oct. 14, 1919.
11 SHEETS—SHEET 6.
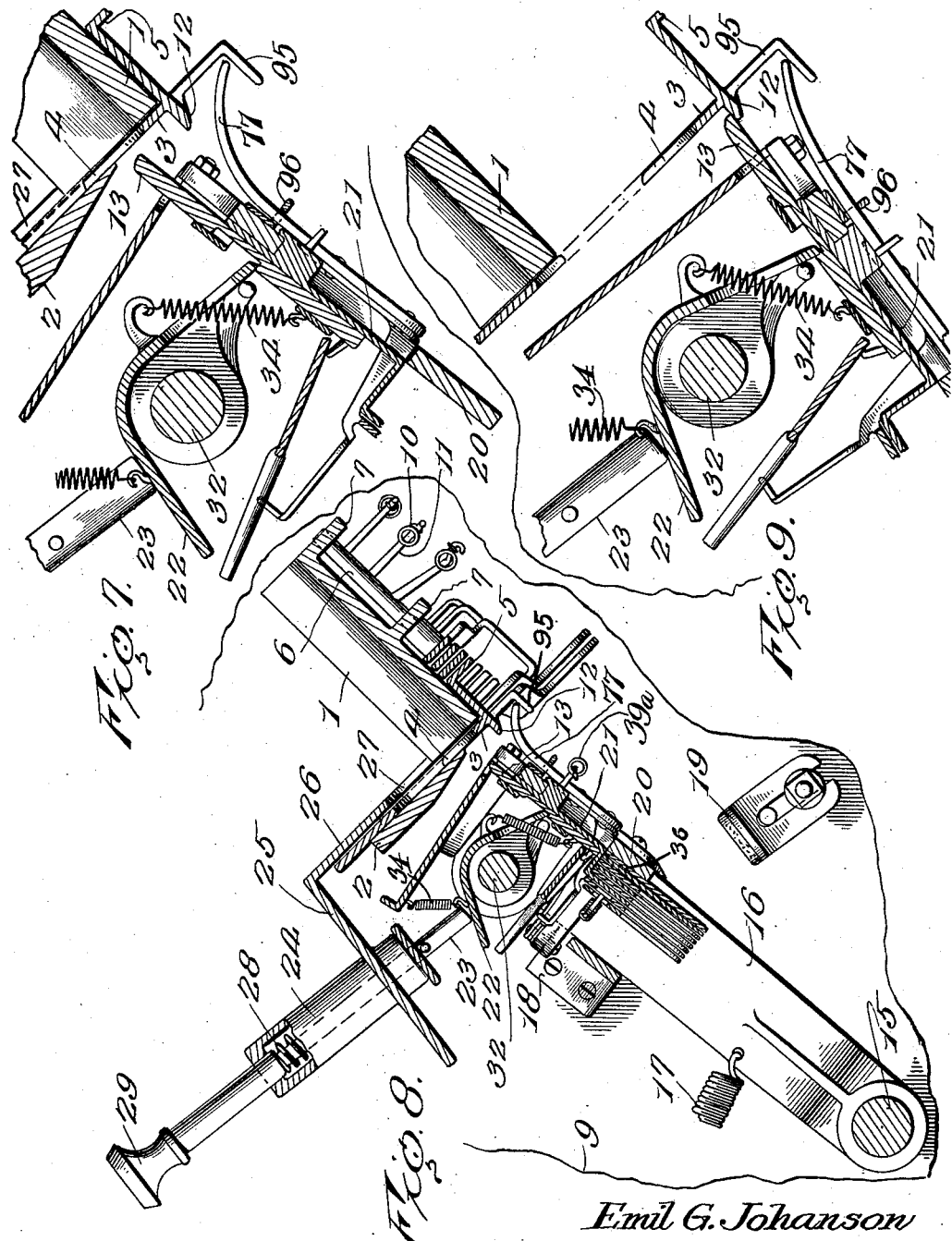
Emil G. Johanson
Inventor.

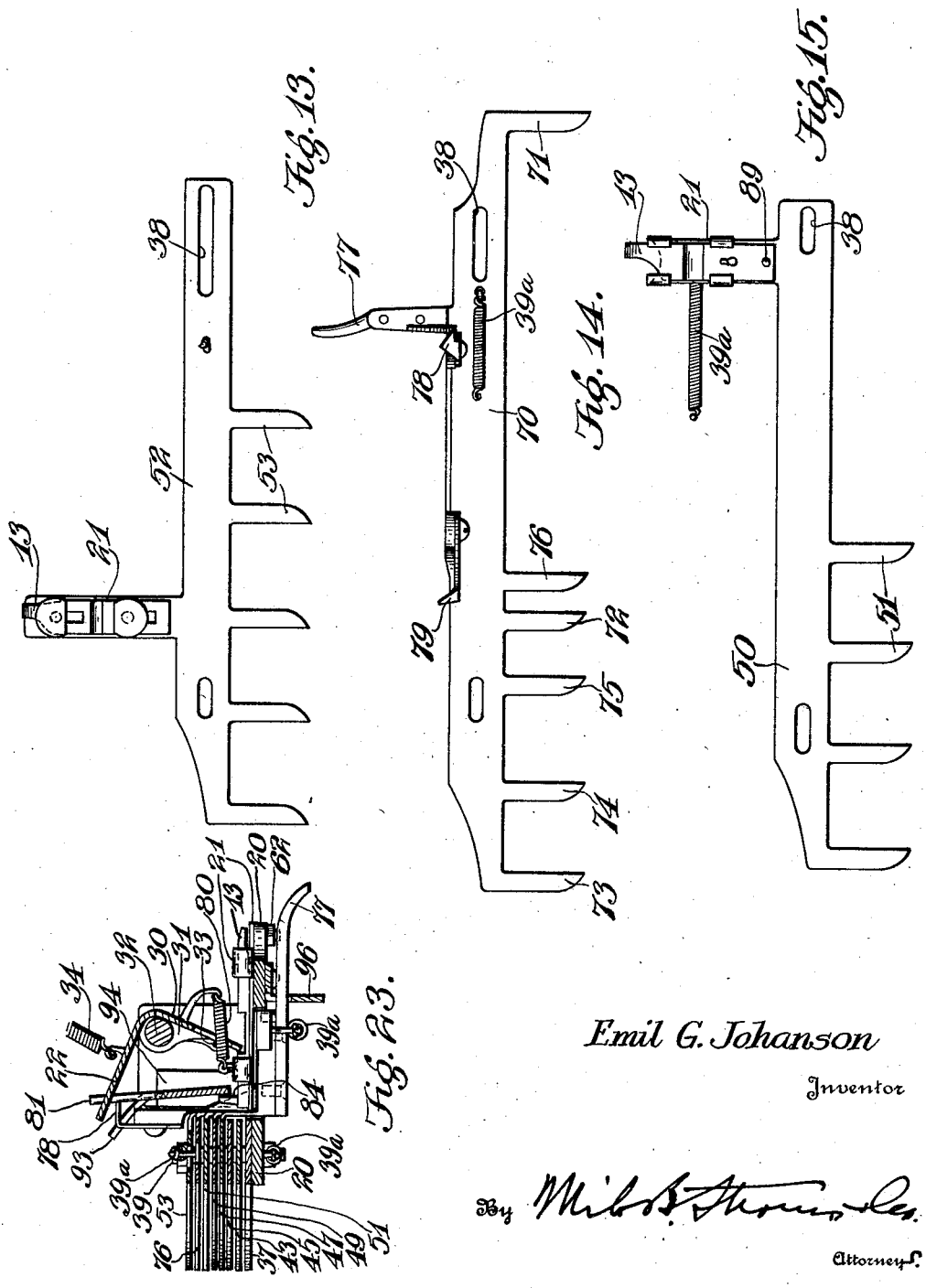

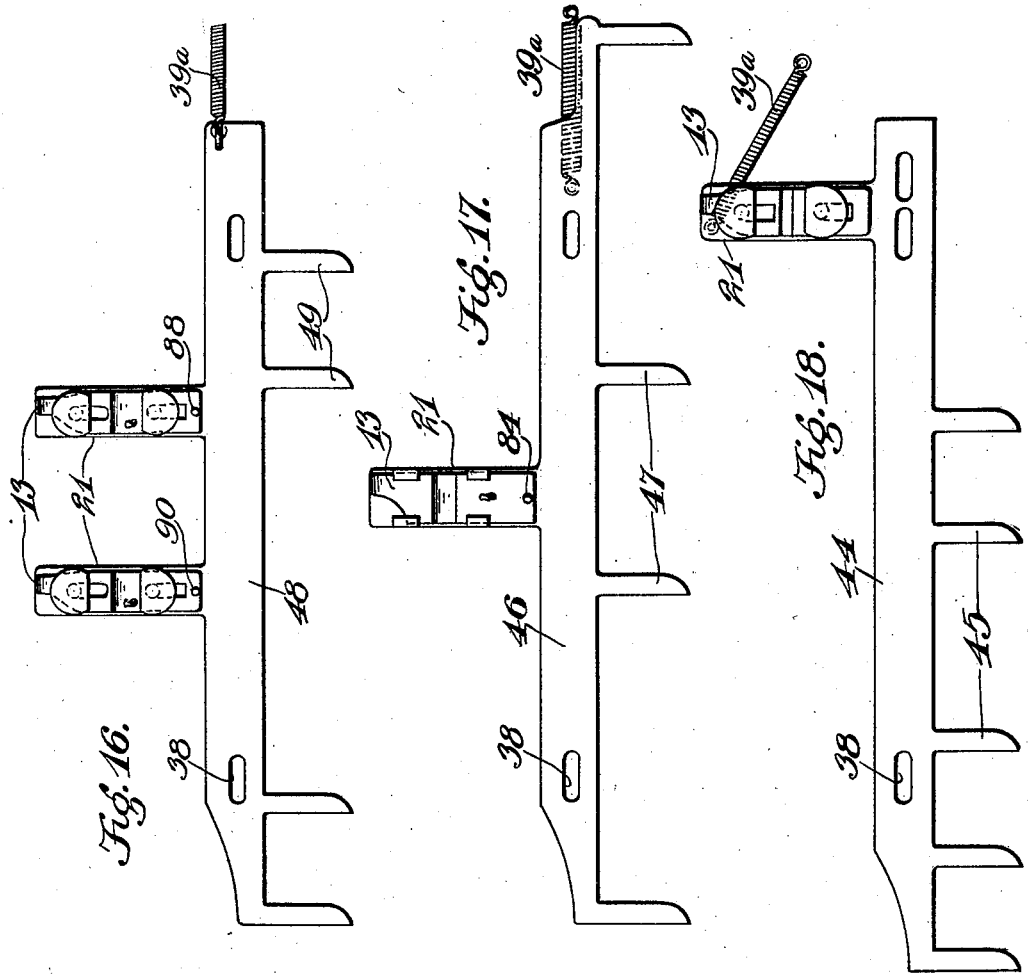

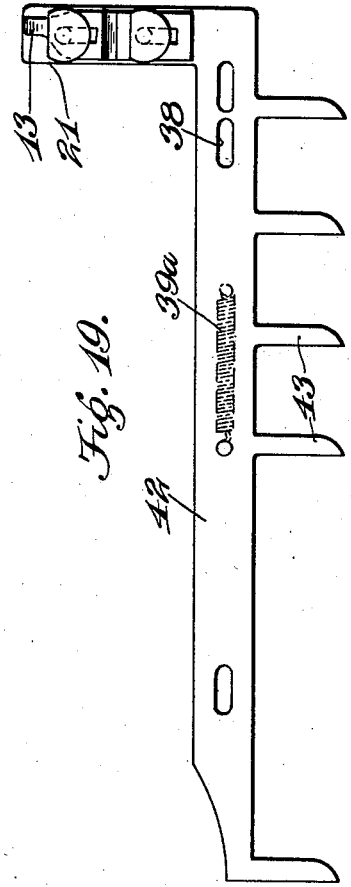
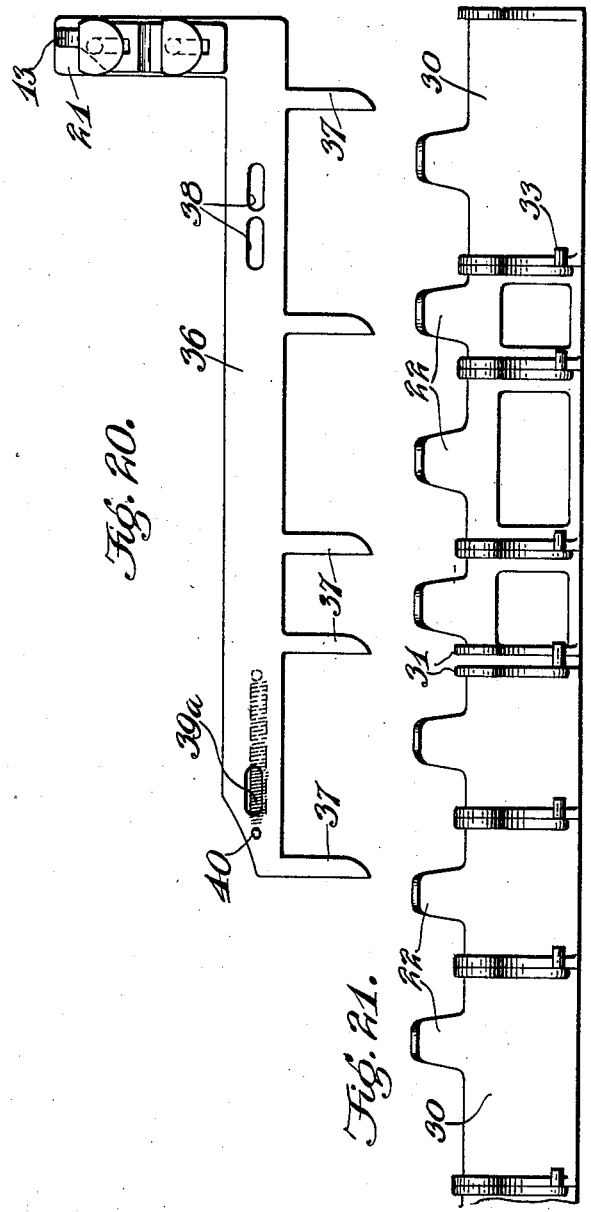

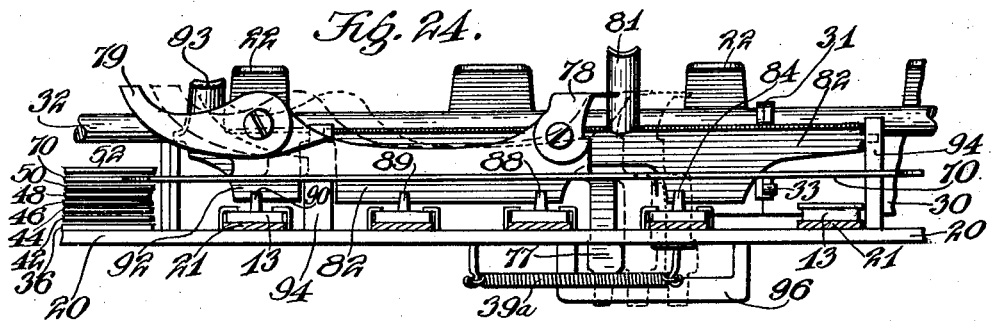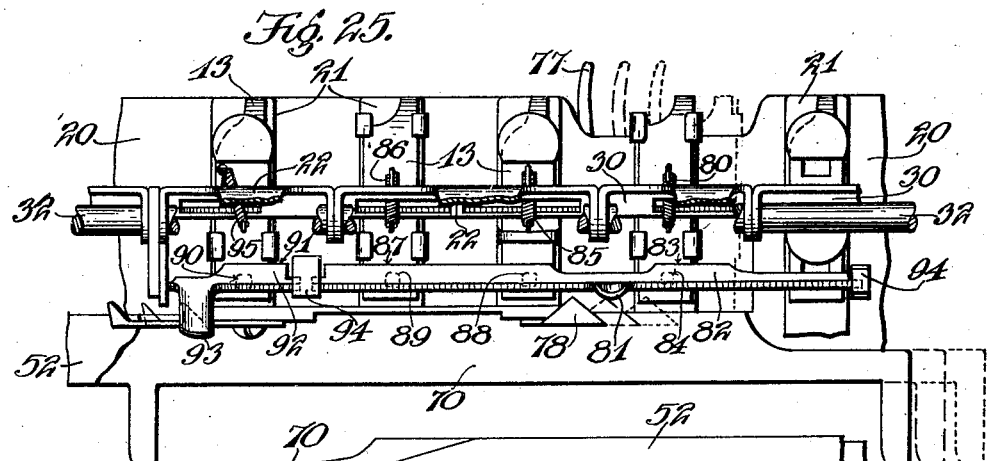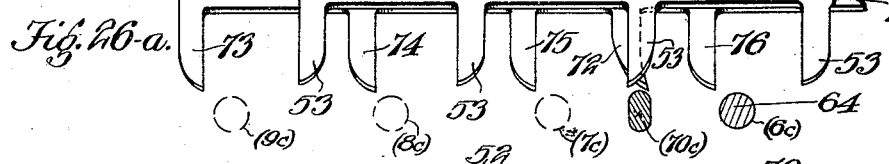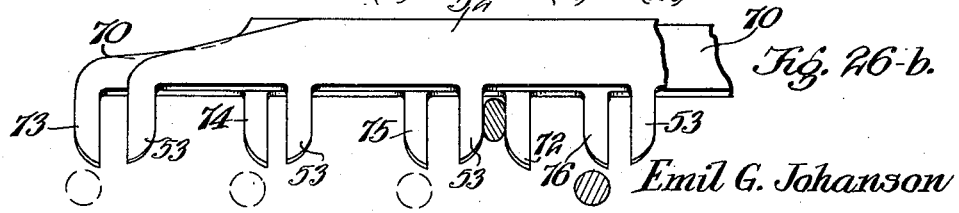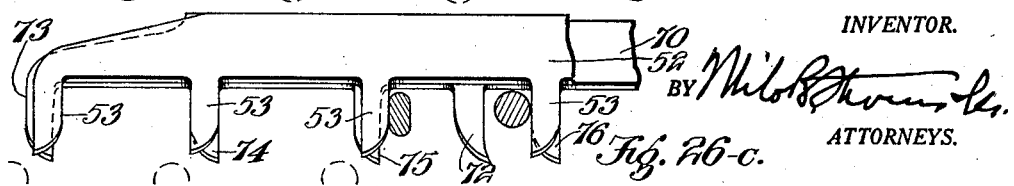
Emil G. Johanson
INVENTOR.
ATTORNEYS.

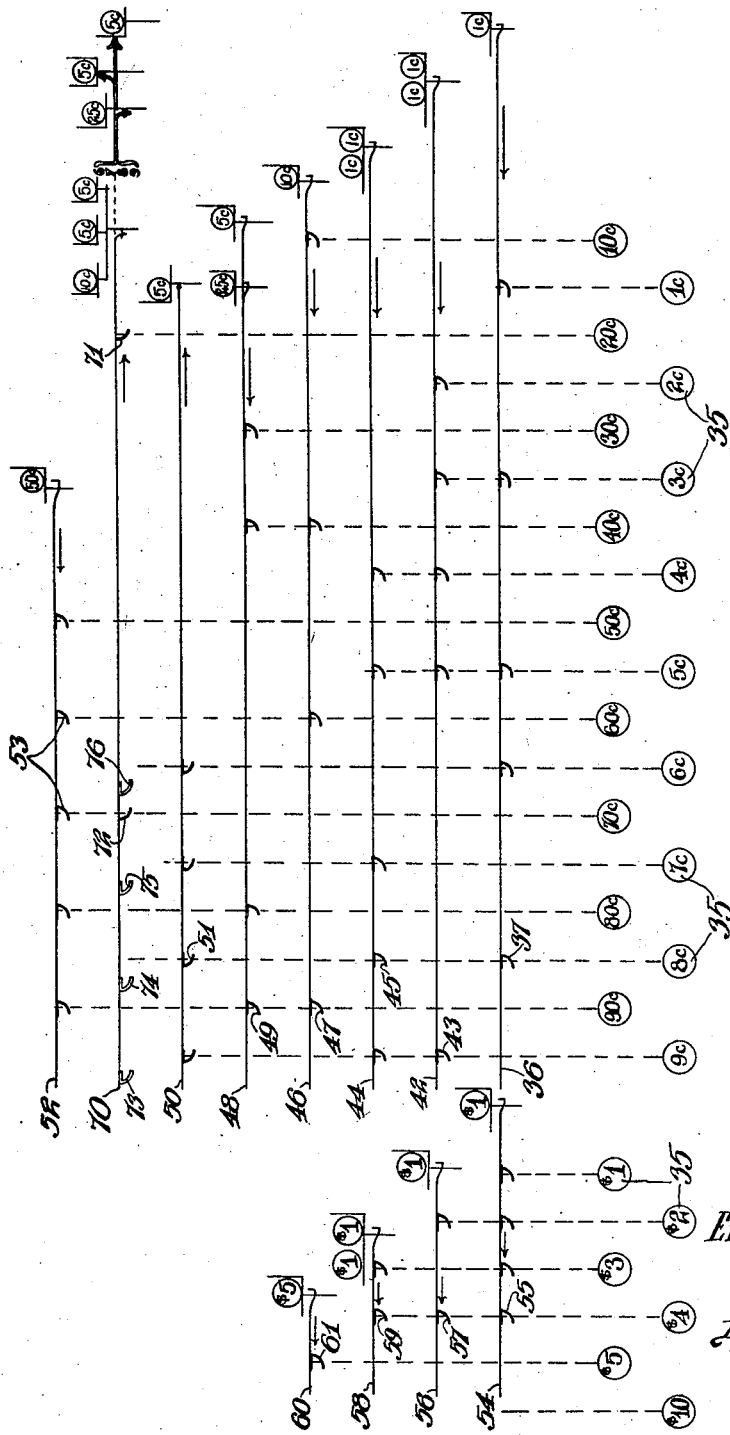

UNITED STATES PATENT OFFICE.

EMIL G. JOHANSON, OF CHICAGO, ILLINOIS, ASSIGNOR TO JOHN T. ISACKSON, OF CHICAGO, ILLINOIS.

CHANGE-MAKING MACHINE.

1,318,762.   Specification of Letters Patent.   Patented Oct. 14, 1919.

Application filed January 10, 1918. Serial No. 211,192.

*To all whom it may concern:*

Be it known that I, EMIL G. JOHANSON, a subject of the King of Sweden, residing at Chicago, in the county of Cook and State of Illinois, have invented new and useful Improvements in Change-Making Machines, of which the following is a specification.

This invention relates to machines for mechanically performing the operation of subtraction, and more particularly a machine which is employed for delivering coins having a value corresponding to the difference between the amount tendered for a purchase and the amount of the purchase; or, in other words, a change-making machine.

The invention has for its object to provide a machine of the kind stated which is reliable in operation, and without unnecessary complications, and, furthermore, which is easy to manipulate, it being necessary to depress one or more keys corresponding to the amount of the purchase, and one or more keys corresponding to the amount of money tendered in payment thereof, whereupon the correct change is automatically delivered.

Other objects and advantages of the invention will be pointed out in the detailed description appearing hereinafter, and in order that the invention may be better understood, reference is had to the accompanying drawings forming a part of this specification.

In the drawings—

Figure 1 is a side elevation of the machine, partly in section; Fig. 2 is a plan view with a portion of the casing removed; Fig. 3 is a plan view of the mechanism with certain parts removed; Fig. 4 is a rear elevation of the coin ejector mechanism; Fig. 5 is a front elevation of a portion of said mechanism; Fig. 6 is a plan view of the parts shown in Fig. 5; Fig. 7 is a sectional detail of the ejector mechanism; Fig. 8 is another sectional detail of said mechanism, with additional parts associated therewith; Fig. 9 is a view similar to Fig. 7, but showing the parts in another position; Figs. 10 to 20 show the component parts of the coin ejector mechanism separated; Fig. 21 is a plan view of an actuating means for the ejectors; Fig. 22 is a perspective view of a fragment of the parts shown in Fig. 21; Fig. 23 is a section of the line A—A of Fig. 5; Fig. 24 is a duplicate of Fig. 6, with some parts removed or cut away to more clearly disclose an auxiliary ejector mechanism; Fig. 25 is a plan view of Fig. 24, also with some parts removed for the same purpose; Figs. 26$^a$, 26$^b$, and 26$^c$ are perspective views of certain slide bars controlling the aforesaid auxiliary ejector mechanism, showing three stages in their operation; Fig. 27 is a diagram illustrating a mechanism for selecting the ejectors, and Fig. 28 is a perspective view of a fragment of an ejector designed for ejecting two coins simultaneously.

Referring specifically to the drawings, a holder for the coins to be delivered consists of a series of inclined trays 1 in which the coins are supported in stacks, and from which they are taken, one after the other, from the bottom. The trays are arranged in a row along a shelf 2 so positioned with respect to the bottom of the trays as to provide a support for the stacks of coins, the trays being open at the bottom, and the stacks of coins resting on the shelf. Associated with each tray is a coin ejector slide 3 having an opening 4 corresponding to the size of the coin to be ejected. The slides operate between the bottom of the trays and the top of the shelf, these parts being spaced sufficiently to accommodate the slides. Normally, each slide is so positioned that the bottom one of the stacks of coins seats in the opening 4, and as the slide corresponds in thickness to the thickness of the coins, it will be evident that the bottom coin of the stack will be pushed laterally from beneath the stack when the corresponding slide is operated, and when the slide returns to its normal position, the stack lowers and the next coin drops into the opening 4 ready to be ejected. Certain ones of the ejectors have a thickness corresponding to the combined thickness of two coins so that two coins are simultaneously thrown out. One of these ejectors is shown in Fig. 28. In Fig. 3 the trays are shown with indicia denoting the particular coins for which they are intended. From the two trays marked "2c" two pennies are designed to be ejected simultaneously. It will also be noted that one of the trays is marked "$2", and from this tray two silver dollars are adapted to be ejected simultaneously. As pointed out hereinbefore, the ejector slides which eject two coins simultaneously have a thickness corresponding to the combined thickness of the two coins.

Each ejector slide 3 (Figs. 1 and 8) is carried by an arm 5 at the outer end of the latter, the inner end of the arm extending from a rock shaft 6 journaled in flanges 7 on the back of the trays 1, the latter being, preferably, a single casting having lateral flanges 8 (Fig. 4) at its ends for attachment, by suitable fasteners, to the side walls 9 of the housing or frame of the machine. Associated with the rock shaft 6 are springs 10 for returning the slides to normal position, these springs being anchored at one end to the back of the trays, and at their other ends to arms 11 extending outward from the rock shafts. On each ejector slide 3 is a lug 12 which is in the path of an actuator whereby the slide is operated to effect the discharge of the coins. This actuator is a swinging member carrying a series of fingers 13 corresponding in number and position to the lugs 12. The fingers are slidable in the direction of their length, and they are normally in retracted position, and a means is also provided for selectively advancing the same to operative position, and when the swinging member is operated the selected finger strikes a corresponding lug 12 and operates the corresponding ejector slide 3 to discharge the coin controlled thereby. This mechanism will now be described in detail:

Extending between the frame walls 9, and journaled in bearings 14 (Fig. 4) supported thereon, is a rock shaft 15 having rocker arms 16 at its ends which are held normally by a spring 17 against a stop bar 18 extending between and carried by the walls 9, the spring being anchored at its ends to one of the arms and walls. On one of the walls 9 is also a stop 19 to limit the forward swing of the arms 16, and the latter are therefore free to swing between the stops 18 and 19.

Extending between and carried by the outer ends of the arms 16, is a plate 20 on the front face of which are slidable carriers and guides 21 in which the fingers 13 are slidably mounted so that they may be advanced or retracted. The carriers 21 are slidable in the direction of the length of the plate 20 so that any one of the fingers 13 may be selected and moved laterally with respect to its co-acting lug 12 clear of the latter, and thus be rendered inactive. This selector mechanism will be presently described.

Extending back of the row of fingers 13 is a series of key-operated levers 22 which are operatively connected to the fingers for advancing the same into operative position, and also for carrying the same bodily forward to effect the coin-ejecting operation. These levers are beneath the lower ends of plungers 23 slidably mounted in bearing tubes 24 carried by a plate 25 extending between and supported by the walls 9. This plate 25 has a top flange 26 provided with a scalloped edge 27 to conform to and serve as a cover for the ejector slides 3. The plungers 23 are held normally retracted by springs 28, and on their upper ends are keys 29 which are suitably inscribed to denote the denomination of coins they control. When these keys are depressed, the plungers 23 press down on the levers 22 and tilt the same to advance the fingers 13 into operative position, and upon continuing the downward movement of the plungers the plate 21, carried by the arms 16 and supporting the fingers 13, swings, whereupon the projected finger or fingers engage the lugs 12 to actuate the corresponding ejector slides 3, as shown in Fig. 9. Figs. 7 and 8 show the position of the parts before the plungers are advanced to actuate the ejector mechanism, and Fig. 9 illustrates said mechanism at the end of its working stroke, after which the parts return to the position shown in Fig. 8.

The trays 1 (Fig. 3) are designed to hold coins of the following denominations: The first three trays at the right each holds pennies, but from the second and third trays two pennies are simultaneously ejected; the next two trays hold nickels; the next tray holds dimes; the next tray holds quarters; the next tray holds half dollars; each of the next two trays holds silver dollars; the next tray also holds silver dollars, but two of same are simultaneously ejected therefrom, and the last tray is designed to hold five dollar gold pieces. It will be seen from the foregoing that if all the ejector slides 3 are operated at one time, coins to the value of ten dollars will be ejected. The keys 29, reading from right to left, are inscribed, respectively: 5c, 10c, 25c, 50c, $1, $2, $5 and $10. The levers 22 are so arranged that when the "5c" key is depressed, one penny is discharged from the first tray to the right, and two pennies from each of the next two trays, making a total of five pennies. This lever therefore must control the ejector fingers 13 associated with the slides 3 of these three trays, and for this purpose it is widened as shown at 30 (Fig. 5) and connected to said ejector fingers. Intermediate its ends, the lever has lateral ears 31 for pivotal connection to a transverse shaft 32 carried by the arms 16, the lever being loosely mounted on the shaft. All the levers 22 are supported in this manner, and a means is provided for interlocking said levers so that when the selected key 29 is depressed, a group of levers will be actuated which will operate ejector fingers corresponding in value to the value of the key depressed. Take now the "10c" key: When this key is depressed, it operates the 5c lever and also the three penny levers, so that one nickel and five pennies are ejected. The motion of the "nickel" lever, which is actuated by the "10c" key is transmitted to the "pennies" lever by providing the former with a projecting side pin 33 (Fig. 22) which engages the latter to swing the same. This pin, however, does not interfere with the swing of the "pennies" lever independent of the "nickel" lever. All the levers are provided with a similar interlocking means, and when the "$10" lever is swung the entire set of levers swings, and consequently coins to the value of ten dollars are ejected. Suitable return springs 34 (Fig. 8) are provided for the levers.

Before the keys 29 are operated to effect the coin-ejecting operation, the ejectors to be actuated must be selected. A selector mechanism, operated by a second set of keys 35, is provided for this purpose. These keys are first depressed to select the ejectors, and the keys 29 are then depressed to eject the coins. The machine mechanically performs the operation of subtracting the purchase price from the amount tendered in payment thereof, the amount of money representing the difference being automatically delivered. The keys 35 and the mechanism controlled thereby are designed to impress on the machine the purchase price, and the keys 29 and the mechanism associated therewith impress on the machine the amount tendered in payment.

The selector mechanism controlled by the keys 35 comprise the following parts:

The carrier 21 for the finger 13 which actuates the ejector slide 3 of the first "pennies" tray 1 to the right, is shown in Fig. 20. This carrier is an arm extending sidewise from one end of a longitudinal bar 36 seating slidably on the plate 20, and extending sidewise from the bar in the opposite direction is a series of five cam fingers 37 beveled on one side. The bar 36 is slidable in the direction of its length, and it has longitudinal slots 38 through which pass guide pins 39 (Fig. 23) carried by the plate 20. A spring 39ª anchored at one end to the plate 20 and at its other end to a pin 40 on the bar 36, serves to normally draw the latter in a direction to position its finger 13 opposite the lug 12 of the ejector slide 3 which it is designed to operate. The plate 20 has slots 41 (Fig. 4) to accommodate the pin 40.

The carrier 21 for the finger 13 which operates the ejector slide 3 of the second "pennies" tray 1 is shown in Fig. 19. This carrier is an arm extending laterally from a slide bar 42 provided with cam fingers 43.

The carrier for the finger 13 which operates the ejector slide 3 of the third "pennies" tray 1 is shown in Fig. 18, the same being also an arm extending from a slide bar 44 provided with cam fingers 45.

The carrier for the finger 13 which operates the ejector slide 3 of the first "5c" tray 1 is shown in Fig. 15. This carrier is also a lateral arm on a slide bar 50 having cam fingers 51.

Fig. 16 shows a slide bar 48 for the carrier 21 of the two fingers 13 which operate the ejectors 3 of the second "5c" tray and also the "25c" tray, this slide bar being also provided with cam fingers 49.

The carrier 21 for the finger 13 which operates the ejector 3 of the "10c" tray 1 is shown in Fig. 17, this carrier being also an arm extending from a slide bar 46 provided with cam fingers 47.

The carrier 21 for the finger 13 which operates the ejector 3 of the "50c" tray is shown in Fig. 13, the same being also an arm extending from a slide bar 52 provided with cam fingers 53.

Fig. 12 shows a slide bar 54 provided with cam fingers 55. This slide bar has the carrier 21 for the finger 13 which operates the ejector 3 of the first "$1" tray.

A slide bar 56 provided with cam fingers 57 is shown in Fig. 11. This slide bar has the carrier 21 for the finger 13 which operates the ejector 3 of the second "$1" tray 1.

Fig. 10 shows a slide bar 58 provided with cam fingers 59, and a slide bar 60 provided with a cam finger 61. The first-mentioned slide bar has the carrier 21 for the finger 13 which operates the ejector 3 of the "$2" tray 1, and the other slide bar has the carrier 21 for the finger 13 which operates the ejector 3 of the "$5" tray.

The several slide bars hereinbefore described are mounted in superposed relation on the plate 20, with suitable guide pins 39 and return springs 39ª for all, and the arms 21 are provided with guide pins 62 (Fig. 23) working in slots 63 (Fig. 5) in the plate 20.

The keys 35 are suitably inscribed to indicate their value, as shown in Fig. 2, and each key is on a lever 64 (Fig. 1), the several levers all being independently fulcrumed on a transverse shaft 65 supported by the walls 9 and extending therebetween. Springs 66 connected to the levers normally hold the keys 35 in elevated position, and restore the same to this position upon their release after having been depressed.

The rear end of the levers 64 coöperate with the cam fingers on the slide bars 36, 42, etc., for actuating said bars. It will be noted that the cam fingers are beveled on one side, and hence when the levers are pressed against this side the slide bars are deflected sidewise in a direction determined by the side on which the incline is located.

The cam fingers 37, 43, etc., are positioned in a certain predetermined relation with respect to the levers 64, so that when a lever having a value corresponding to the purchase price is depressed, a slide bar is operated which withdraws into inoperative position one or more ejector actuating fingers 13 which, when in operative position, would eject coins to that amount. If now a key 29 corresponding to the amount tendered in payment of the purchase is depressed, it will be evident that there will be ejected an amount of money representing the difference between the purchase price and the amount tendered in payment thereof. The amount of the purchase is indicated by targets 67 (Fig. 1) which are operatively connected to the levers 64, the arrangement being similar to that found in cash registers.

Fig. 14 shows an auxiliary slide bar 70 interposed in the group of slide bars hereinbefore described, and having a special function to be pointed out hereinafter. This auxiliary slide bar has cam fingers 71, 72, 73, 74, 75 and 76 on the same side as the cam fingers of the other slide bars, and it also carries an auxiliary ejector actuating finger 77 which at certain times actuates the ejector slide 3 of the first "5c" tray 1. The bar 70 also carries two longitudinally spaced cam lugs 78 and 79, respectively, the function of which will be presently described.

All of the levers 22, except those controlled by the "10c", "25c" and "50c" keys 29, are positively connected to the fingers to advance or retract the same. The "10c-key" lever 22 is connected to the first "5c" ejector finger by a spring or other yieldable connection 80, (Figs. 23 and 25) and when the slide bar 70 is shifted a certain distance the lug 78 comes behind an arm 81 (Fig. 24) on a rocking bar 82 provided with an abutment 83 engaging a pin 84 on said "5c" finger, and hence, when said "10c" lever is operated, the last mentioned "5c" finger cannot advance, the spring 80 being now merely stretched. Yielding connections 85 and 86, respectively, (Fig. 25) are also provided between the "25c-key" lever 22 and the second "5c" finger, as well as the "10c" finger. The bar 82 has an abutment 87 coöperating with pins 88 and 89, respectively, on the second "5c" and the "10c" fingers, for holding the same retracted. On the "25c" ejector finger is a pin 90 which is opposite an abutment 91 on a second rocking bar 92 having a projecting arm 93 in the path of the cam lug 79. The bars 82 and 92 are suitably supported on the plate 20, brackets being shown at 94. A yielding connection 95 is provided between the "50c-key" lever and the "25c" ejector finger. It will therefore be seen that the second "5c" finger, the "10c" finger and the "25c" finger can also be held against being advanced.

The "20c" and "70c" keys 35, through their levers 64, move the slide bar 70 in the direction of its length to such a position that the cam 78 comes behind the arm 81, as denoted by long-dotted outline in Figs. 24 and 25, so that if now the "50c" plunger 23 is depressed, the "10c" and the two "5c" ejector fingers 13 are not advanced into operative position, and only the "25c" finger and all the "pennies" fingers are advanced. Hence, it will be evident that thirty cents (one quarter and five pennies) are thrown out; or, if the "$1" plunger is depressed, a fifty-cent piece, one quarter and five pennies are thrown out. Thus, the correct change for a twenty-cent purchase, when fifty cents is tendered, is one quarter and five pennies, and for a twenty-cent purchase, when one dollar is tendered, is a fifty cent piece, one quarter and five pennies. The bar 70 can move a greater distance than that last described, this movement, after the initial movement, being effected by certain ones of the levers 64 engaging the cam fingers 73, 74, 75 and 76. Normally, the bar 70 is so positioned that these levers do not reach any one of said cam fingers, and it is only after the bar has received the initial movement where the cam 78 engages the rocker arm 81 to hold the "10c" and the two "5c" fingers retracted, that the fingers 73, 74, 75 and 76 arrive in the path of the "6c", "7c", "8c" and "9c" levers 64. If now any one of these levers 64 is actuated, the bar is moved an additional step, as denoted by the fine-dotted outline in Figs. 24 and 25, and the cam lug 79 comes behind the rocker arm 93, with the result that the "10c" and the two "5c" ejector fingers 13 previously held retracted are released, and the "25c" ejector finger is held retracted when the proper plunger 23 is depressed. The last described movement of the bar 70 has also shifted the first "5c" ejector finger laterally into inoperative position, and the finger 77 has moved into its place to actuate the corresponding ejector slide 3, the latter having an abutment 95 (Fig. 7) in the path of said finger 77. Assume now: that a purchase of twenty-six cents was made, the amount tendered being one dollar; that the "20c" key 35 was first depressed, causing the initial movement of the slide bar 70; that the "6c" key 35 was next depressed, with the "20c" key still held down, causing the second movement of said slide bar 70. Said second movement resulted in the "6c-key" lever 64 shifting the "1c" ejector finger 13 laterally into inoperative position. This leaves the "50c", the "10c", the second "5c" and the two "2c" ejector fingers, as well as the auxiliary ejector finger 77, in operative position, and hence when the "$1" plunger 23 is depressed, seventy-four cents is ejected in the denominations of one fifty-cent piece, one ten-cent piece, two nickels and four pennies.

It will be evident from the foregoing that for certain combinations of change, where an amount between twenty and twenty-five cents is included, the "25c" ejector finger 13 is rendered inoperative, and the "10c" and the two "5c" ejector fingers, plus the necessary "1c" fingers, are placed in operative position.

Fig. 27 shows a diagram illustrating the operation of the selector mechanism, the dotted lines leading from the bank of keys 35 representing the levers 64, and the solid lines crossing said dotted lines representing the various slide bars and the cam fingers thereon. The cam fingers 71 and 72 are shown in single lines, whereas the cam fingers 73, 74, 75 and 76 are shown in double lines. At the end of each representation of the slide bars is a diagrammatic representation of the connection between the same and the various ejector fingers 13, the arrows indicating the direction in which the parts are shifted. The showing at the extreme right end of the line representing the slide bar 70 indicates the additional or final movement of said slide bar, as above described, and consists of double lines to correspond with the diagrammatic showing of the cam fingers 73, 74, 75 and 76. It will be noted that all of the slide bars, except the slide bar 70, move the ejector elements corresponding thereto in the direction of the length of said slide bars; the showing of the slide bar 70, however, indicates that the "10c", second "5c" and first "5c" ejector fingers are retracted (into inoperative position) upon the initial movement of the slide bar; and that the "25c" ejector finger is retracted (into inoperative position), the first "5c" ejector finger is shifted toward the right (into inoperative position), and the auxiliary "5c" ejector finger 77 is shifted toward the right, yet ostensibly placed in forwardly projected and operative position. The action of said auxiliary ejector finger 77 is also illustrated by dotted lines in Figs. 4, 24 and 25, to correspond with the dotted showing of other parts of the auxiliary ejector mechanism.

In order that the effect of the "20c" or "70c" lever 64 upon the cam fingers of the slide bar 70 may be more apparent, attention is directed to Figs. 26ª, ᵇ, ᶜ, and Fig. 27. In Figs. 26ª, ᵇ, ᶜ, the levers 64, representing the "70c" and "6c" keys 35, are denoted by full lines, while the corresponding levers 64, representing the "7c", "8c" and "9c" keys 35, are denoted by dotted lines. In Fig. 26ª the slide bars 52 and 70 are shown in their normal position. Assuming now that a seventy-six cent purchase is made for which one dollar is tendered, that key 35, which is marked "70c" will first be depressed. This action causes the "70c" lever 64 to advance between the normally crossed points of the cam fingers 53 and 72 of the respective slide bars, both latter being shifted outwardly to locate the said lever between the said cam fingers, as shown in Fig. 26ᵇ. The effect of this move is to render the "50c", "10c" and both "5c" ejector fingers 13 inoperative as affecting the coin ejectors 3, as indicated in Fig. 27. The operator's next move is to depress the "6c" key 35, while the "70c" key is still held down. This action advances the "6c" lever 64 upon the cam finger 76, which during the preceding move (Fig. 26ᵇ) assumed a position opposite said "6c" lever 64. The present move does not affect the "50c" slide bar 52, which is being held still by the advanced "70c" lever 64, but shifts the slide bar 70 an additional distance in the direction of its previous shift, as shown in Fig. 26ᶜ. This stroke of said slide bar operates the auxiliary ejecting mechanism described in a previous section. It will be apparent from the dotted showing in Figs. 26ª, ᵇ, ᶜ that the "7c", "8c" or "9c" levers 64 will act upon the cam fingers 75, 74 or 73, respectively, to duplicate the action of the "6c" lever 64, if corresponding keys 35 are depressed for a seventy-seven cent, seventy-eight cent or seventy-nine cent purchase. It will also be noted that the "70c" and "20c" levers 64 are made narrower than the remaining levers, that they may impart to the bar 70 the short initial stroke hereinbefore described.

Referring to Figs. 7, 8 and 9, it will be observed that the abutment 95 is made integral with the abutment 12 of the slide 3 at the bottom of the first "nickels" coin receptacle. The said abutment 95 is spaced from, and to the rear of, the abutment 12, and is without function until the auxiliary ejector finger 77 is moved to the second dotted line position to the left in Fig. 4. The finger is then located between the opposed abutments 12 and 95, and engages the latter when the plate 20 is rocked rearwardly about the shaft 15, accomplishing, among other results, the ejection of a "5c" coin from the first "5c" coin receptacle. On the back of the plate 20 is a guide 96 for the finger 77.

I claim:

1. A change-making machine comprising a series of coin holders, coin ejectors associated with the respective holders, a movable carrier for the ejectors on which the latter are shiftably mounted, a plurality of key-operated means for moving the carrier bodily to operate the ejectors, said means being also engageable with the ejectors to advance the same for a working stroke and to retract the same, and certain ones of said means being operatively connected to a plurality of ejectors, means for locking each of the aforesaid carrier actuating means to the adjacent carrier actuating means of a lower money value, and means for selectively shifting the ejectors into inoperative position on the carrier.

2. A change-making machine comprising a series of coin holders, coin ejectors associated with the respective holders, a movable carrier for the ejectors on which the latter are shiftably mounted, a plurality of key-operated means for moving the carrier bodily to operate the ejectors, said means being also engageable with the ejectors to advance the same for a working stroke and to retract the same, means for locking each of the aforesaid carrier actuating means to the adjacent carrier actuating means of a lower money value, and means for selectively shifting the ejectors into inoperative position on the carrier.

3. A change-making machine comprising a series of coin holders, coin ejectors associated with the respective holders, a plurality of longitudially shiftable bars supporting the ejectors, said ejectors being shiftable laterally on the bars, a movable carrier for the bars, a plurality of key-operated means for moving the carrier bodily to operate the ejectors, said means being also engageable with the ejectors to advance the same for a working stroke and to retract the same, and certain ones of said means being operatively connected to a plurality of ejectors, means for locking each carrier operating means to the adjacent carrier operating means of a lower money value, and means for selectively shifting the bars to place the ejectors into inoperative position.

4. A change-making machine comprising a series of coin holders, coin ejectors associated with the respective holders, a plurality of longitudinally shiftable bars supporting the ejectors, said ejectors being shiftable laterally on the bars, a movable carrier for the bars, a plurality of key-operated means for moving the carrier bodily to operate the ejectors, said means being also engageable with the ejectors to advance the same for a working stroke and to retract the same, means for locking each carrier operating means to the adjacent carrier operating means of a lower money value, and means for selectively shifting the bars to place the ejectors into inoperative position.

5. A change-making machine comprising a series of coin holders, coin ejectors associated with the respective holders, a plurality of longitudinally shiftable bars supporting the ejectors, said ejectors being shiftable laterally on the bars, a movable carrier for the bars, a plurality of key-operated means for moving the carrier bodily to operate the ejectors, said means being also engageable with the ejectors to advance the same for a working stroke and to retract the same, means for locking each carrier operating means to the adjacent carrier operating means of a lower money value, and means for selectively shifting the bars to place the ejectors into inoperative position, certain ones of the ejectors ejecting more than one coin simultaneously.

6. A change-making machine comprising a series of coin holders, coin ejectors associated with the respective holders, a movable carrier for the ejectors on which the latter are shiftably mounted, a plurality of key-operated means for moving the carrier bodily to operate the ejectors, said means being also engageable with the ejectors to advance the same for a working stroke and to retract the same, means for locking each of the aforesaid carrier actuating means to the adjacent carrier actuating means of a lower money value, and means for selectively shifting the ejectors into inoperative position on the carrier, certain ones of the ejectors ejecting more than one coin simultaneously.

7. A change-making machine comprising a series of coin holders, slidable coin ejectors associated with the respective holders, a plurality of longitudinally shiftable bars supporting the ejectors and having cam fingers, a movable carrier for the bars, a plurality of key-operated means moving the carrier bodily to operate the ejectors, said means being also engageable with the ejectors to advance the same for a working stroke and to retract the same, means for locking each carrier operating means to the adjacent carrier operating means of a lower money value, and a series of key-operated levers selectively engageable with the aforesaid cam fingers for shifting the aforesaid bars on the carrier.

8. A change-making machine comprising a series of coin holders, coin ejectors associated with the respective holders, a movable carrier for the ejectors on which the latter are shiftably mounted, a plurality of key-operated means for moving the carrier bodily to operate the ejectors, said means being also engageable with the ejectors to advance the same for a working stroke and to retract the same, and certain ones of said means being operatively connected to a plurality of ejectors, and means for selectively shifting the ejectors into inoperative position on the carrier.

9. A change-making machine comprising a series of coin holders, coin ejectors associated with the respective holders, a movable carrier for the ejectors on which the latter are shiftably mounted, a plurality of key-operated means for moving the carrier bodily to operate the ejectors, said means being also engageable with the ejectors to advance the same for a working stroke and to retract the same, and means for selectively shifting the ejectors into inoperative position on the carrier.

10. A change-making machine comprising a series of coin holders, coin ejectors associated with the respective holders, a movable carrier for the ejectors on which the latter are shiftably mounted, a plurality of key-operated means for moving the carrier bodily to operate the ejectors, said means being also engageable with the ejectors to advance the same for a working stroke and to retract the same, and means for selectively shifting the ejectors into inoperative position on the carrier, certain ones of the ejectors ejecting more than one coin simultaneously.

11. A change-making machine comprising a series of coin holders, coin ejectors associated with the respective holders, a plurality of longitudinally shiftable bars supporting the ejectors, said ejectors being shiftable laterally on the bars, a movable carrier for the bars, a plurality of key-operated means for moving the carrier bodily to operate the ejectors, said means being also engageable with the ejectors to advance the same for a working stroke and to retract the same, and means for selectively shifting the bars to place the ejectors into inoperative position.

12. A change-making machine comprising a series of coin holders, coin ejectors associated with the respective holders, a plurality of longitudinally shiftable bars supporting the ejectors, said ejectors being shiftable laterally on the bars, a movable carrier for the bars, a plurality of key-operated means for moving the carrier bodily to operate the ejectors, said means being also engageable with the ejectors to advance the same for a working stroke and to retract the same, and means for selectively shifting the bars to place the ejectors into inoperative position, certain ones of the ejectors ejecting more than one coin simultaneously.

13. A change-making machine comprising a series of coin holders, coin ejectors associated with the respective holders, a plurality of longitudinally shiftable bars supporting the ejectors, said ejectors being shiftable laterally on the bars, a movable carrier for the bars, a plurality of key-operated means for moving the carrier bodily to operate the ejectors, said means being also engageable with the ejectors to advance the same for a working stroke and to retract the same, and certain ones of said means being operatively connected to a plurality of ejectors, and means for selectively shifting the bars to place the ejectors into inoperative position.

14. A change-making machine comprising a series of coin holders, coin ejectors associated with the respective holders, a plurality of longitudinally shiftable bars supporting the ejectors, said ejectors being shiftable laterally on the bars, a movable carrier for the bars, a plurality of key-operated means for moving the carrier bodily to operate the ejectors, said means being also engageable with the ejectors to advance the same for a working stroke and to retract the same, and certain ones of said means being operatively connected to a plurality of ejectors, and means for selectively shifting the bars to place the ejectors into inoperative position, certain ones of the ejectors ejecting more than one coin simultaneously.

15. A change-making machine comprising a series of coin holders, coin ejectors associated with the respective holders, a plurality of longitudinally shiftable bars supporting the ejectors, said ejectors being shiftable laterally on the bars, a movable carrier for the bars, a plurality of key-operated means for moving the carrier bodily to operate the ejectors, said means being also engageable with the ejectors to advance the same for a working stroke and to retract the same, and certain ones of said means being operatively connected to a plurality of ejectors, means for locking each carrier operating means to the adjacent carrier operating means of a lower money value, and means for selectively shifting the bars to place the ejectors into inoperative position, certain ones of the ejectors ejecting more than one coin simultaneously.

16. A change-making machine comprising a series of coin holders, slidable coin ejectors associated with respective holders, a plurality of longitudinally shiftable bars supporting the ejectors and having cam fingers, a movable carrier for the bars, a plurality of key-operated means for moving the carrier bodily to operate the ejectors, said means being also engageable with the ejectors to advance the same for a working stroke and to retract the same, and certain ones of said means being connected to a plurality of ejectors, means for locking each carrier operating means to the adjacent carrier operating means of a lower money value, and a series of key-operated levers selectively engageable with the cam fingers for shifting the aforesaid bars on the carrier, certain ones of the aforesaid ejectors ejecting more than one coin simultaneously.

17. A change-making machine comprising a series of coin holders, slidable coin ejectors associated with the respective holders, a plurality of longitudinally shiftable bars supporting the ejectors and having cam fingers, a movable carrier for the bars, a plurality of key-operated means for moving the carrier bodily to operate the ejectors, said means being also engageable with the ejectors to advance the same for a working stroke and to retract the same, and certain ones of said means being connected to a plurality of ejectors, means for locking each carrier operating means to the adjacent carrier operating means of a lower money value, and a series of key-operated levers selectively engageable with the cam fingers for shifting the aforesaid bars on the carrier.

18. A change-making machine comprising a series of coin holders, slidable coin ejectors associated with the respective holders, a plurality of longitudinally shiftable bars supporting the ejectors and having cam fingers, a movable carrier on the bars, a plurality of key-operated means for moving the carrier bodily to operate the ejectors, said means being also engageable with the ejectors to advance the same for a working stroke and to retract the same, and certain ones of said means being connected to a plurality of ejectors, and a series of key-operated levers selectively engageable with the cam fingers for shifting the aforesaid bars on the carrier.

19. A change-making machine comprising a series of coin holders, slidable coin ejectors associated with the respective holders, a plurality of longitudinally shiftable bars supporting the ejectors and having cam fingers, a movable carrier for the bars, a plurality of key-operated means for moving the carrier bodily to operate the ejectors, said means being also engageable with the ejectors to advance the same for a working stroke and to retract the same, and a series of key-operated levers selectively engageable with the cam fingers for shifting the aforesaid bars on the carrier.

20. A change-making machine comprising a series of coin holders, slidable coin ejectors associated with the respective holders, a plurality of longitudinally shiftable bars supporting the ejectors and having cam fingers, a movable carrier for the bars, a plurality of key-operated means for moving the carrier bodily to operate the ejectors, said means being also engageable with the ejectors to advance the same for a working stroke and to retract the same, and a series of key-operated levers selectively engageable with the cam fingers for shifting the aforesaid bars on the carrier, certain ones of the aforesaid ejectors ejecting more than one coin simultaneously.

21. A change-making machine comprising a series of coin holders, slidable coin ejectors associated with the respective holders, a plurality of longitudinally shiftable bars supporting the ejectors and having cam fingers, a movable carrier for the bars, a plurality of key-operated means actuating the carrier to operate the ejectors, said means also having connections with the ejectors to advance and retract the same, a series of key-operated levers selectively engageable with the cam fingers for shifting the aforesaid bars on the carrier, an auxiliary slide bar on the carrier having an auxiliary coin ejector and cam fingers in the path of certain ones of the aforesaid key-operated levers, means on the auxiliary slide bar and a mechanism controlled thereby for rendering a group of the coin ejectors inoperative on an initial movement of said bar, a further movement of the bar restoring all but one of said group for operativeness and rendering another ejector inoperative, and also placing the auxiliary ejector in operative position to take the place of the ejector in the group which was left inoperative.

22. A change-making machine comprising a series of coin holders, slidable coin ejectors associated with the respective holders, a plurality of longitudinally shiftable bars supporting the ejectors and having cam fingers, a movable carrier for the bars, a plurality of key-operated means actuating the carrier to operate the ejectors, said means also having connections with the ejectors to advance and retract the same, a series of key-operated levers selectively engageable with the cam fingers for shifting the aforesaid bars on the carrier, an auxiliary slide bar on the carrier having an auxiliary coin ejector and cam fingers in the path of certain ones of the aforesaid key-operated levers, means on the auxiliary slide bar and a mechanism controlled thereby for rendering a group of the coin ejectors inoperative on an initial movement of said bar, a further movement of the bar restoring all but one of said group for operativeness and rendering another ejector inoperative, and also placing the auxiliary ejector in operative position to take the place of the ejector in the group which was left inoperative, the key-operated levers for certain cam fingers of the auxiliary slide bar being adapted to impart to said bar its initial movement, and other key-operated levers engageable with other cam fingers of the auxiliary slide bar imparting the final movement.

23. A change-making machine comprising a series of coin holders, slidable coin ejectors associated with the respective holders, a plurality of longitudinally shiftable bars supporting the ejectors and having cam fingers, a movable carrier for the bars, a plurality of key-operated means actuating the carrier to operate the ejectors, said means also having connections with the ejectors to advance and retract the same, the connections with certain ones of the ejectors being yielding ones, said ejectors being provided with abutments, a series of key-operated levers selectively engageable with the cam fingers for shifting the aforesaid bars on the carrier, an auxiliary slide bar on the carrier having an auxiliary coin ejector and cam fingers in the path of certain ones of the aforesaid key-operated levers, a pair of rocking members on the carrier and having means engageable with the aforesaid ejector abutments to prevent advance thereof, abutments on the auxiliary slide bar controlling the rocking members, the key-operated levers for certain cam fingers of the auxiliary slide bar being adapted to impart to said bar an initial movement to place one of its abutments in operative position to render a group of coin ejectors inoperative, a further movement withdrawing said abutment and placing the other abutment in operative position to restore all but one of said group for operativeness, and rendering another ejector inoperative, and also placing the auxiliary ejector in operative position to take the place of the ejector in the group which was left inoperative.

24. A change-making machine comprising a series of coin holders, slidable coin ejectors associated with the respective holders, a plurality of longitudinally shiftable bars supporting the ejectors and having cam fingers, a movable carrier for the bars, a plurality of key-operated means actuating the carrier to operate the ejectors, said means also having connections with the ejectors to advance and retract the same, the connections with certain ones of the ejectors being yielding ones, said ejectors being provided with abutments, a series of key-operated levers selectively engageable with the cam fingers for shifting the aforesaid bars on the carrier, an auxiliary slide bar on the carrier having an auxiliary coin ejector and cam fingers in the path of certain ones of the aforesaid key-operated levers, a pair of rocking members on the carrier and having means engageable with the aforesaid ejector abutments to prevent advance thereof, abutments on the auxiliary slide bar controlling the rocking members, the key-operated levers for certain cam fingers of the auxiliary slide bar being adapted to impart to said bar an initial movement to place one of its abutments in operative position to render a group of coin ejectors inoperative, a further movement withdrawing said abutment and placing the other abutment in operative position to restore all but one of said group for operativeness, and rendering another ejector inoperative, and also placing the auxiliary ejector in operative position to take the place of the ejector in the group which was left inoperative, the key-operated levers for certain cam fingers of the auxiliary slide bar being adapted to impart to said bar its initial movement, and other key-operated levers engageable with other cam fingers of the auxiliary slide bar imparting the final movement.

25. A change-making machine comprising a series of coin holders, slidable coin ejectors associated with the respective holders, a plurality of longitudinally shiftable bars supporting the ejectors and having cam fingers, a movable carrier for the bars, a plurality of key-operated means actuating the carrier to operate the ejectors, said means also having connections with the ejectors to advance and retract the same, means for locking each of said means to the adjacent means of a lower money value, a series of key-operated levers selectively engageable with the cam fingers for shifting the aforesaid bars on the carrier, an auxiliary slide bar on the carrier having an auxiliary coin ejector and cam fingers in the path of certain ones of the aforesaid key-operated levers, means on the auxiliary slide bar and a mechanism controlled thereby for rendering a group of the coin ejectors inoperative on an initial movement of said bar, a further movement of the bar restoring all but one of said group for operativeness and rendering another ejector inoperative, and also placing the auxiliary ejector in operative position to take the place of the ejector in the group which was left inoperative.

26. A change-making machine comprising a series of coin holders, slidable coin ejectors associated with the respective holders, a plurality of longitudinally shiftable bars supporting the ejectors and having cam fingers, a movable carrier for the bars, a plurality of key-operated means actuating the carrier to operate the ejectors, said means also having connections with the ejectors to advance and retract the same, means for locking each of said means to the adjacent means of a lower money value, a series of key-operated levers selectively engageable with the cam fingers for shifting the aforesaid bars on the carrier, an auxiliary slide bar on the carrier having an auxiliary coin ejector and cam fingers in the path of certain ones of the aforesaid key-operated levers, means on the auxiliary slide bar and a mechanism controlled thereby for rendering a group of the coin ejectors inoperative on an initial movement of said bar, a further movement of the bar restoring all but one of said group for operativeness and rendering another ejector inoperative, and also placing the auxiliary ejector in operative position to take the place of the ejector in the group which was left inoperative, the key-operated levers for certain cam fingers of the auxiliary slide bar being adapted to impart to said bar its initial movement, and other key-operated levers engageable with other cam fingers of the auxiliary slide bar imparting the final movement.

27. A change-making machine comprising a series of coin holders, slidable coin ejectors associated with the respective holders, certain ones of the ejectors ejecting more than one coin simultaneously, a plurality of longitudinally shiftable bars supporting the ejectors and having cam fingers, a movable carrier for the bars, a plurality of key-operated means actuating the carrier to operate the ejectors, said means also having connections with the ejectors to advance and retract the same, a series of key-operated levers selectively engageable with the cam fingers for shifting the aforesaid bars on the carrier, an auxiliary slide bar on the carrier having an auxiliary coin ejector and cam fingers in the path of certain ones of the aforesaid key-operated levers, means on the auxiliary slide bar and a mechanism controlled thereby for rendering a group of the coin ejectors inoperative on an initial movement of said bar, a further movement of the bar restoring all but one of said group for operativeness and rendering another ejector inoperative, and also placing the auxiliary ejector in operative position to take the place of the ejector in the group which was left inoperative.

28. A change-making machine comprising a series of coin holders, slidable coin ejectors associated with the respective holders, certain ones of the ejectors ejecting more than one coin simultaneously, a plurality of longitudinally shiftable bars supporting the ejectors and having cam fingers, a movable carrier for the bars, a plurality of key-operated means actuating the carrier to operate the ejectors, said means also having connections with the ejectors to advance and retract the same, a series of key-operated levers selectively engageable with the cam fingers for shifting the aforesaid bars on the carrier, an auxiliary slide bar on the carrier having an auxiliary coin ejector and cam fingers in the path of certain ones of the aforesaid key-operated levers, means on the auxiliary slide bar and a mechanism controlled thereby for rendering a group of coin ejectors inoperative on an initial movement of said bar, a further movement of the bar restoring all but one of said group for operativeness and rendering another ejector inoperative, and also placing the auxiliary ejector in operative position to take the place of the ejector in the group which was left inoperative, the key-operated levers for certain cam fingers of the auxiliary slide bar being adapted to impart to said bar its initial movement, and other key-operated levers engageable with other cam fingers of the auxiliary slide bar imparting the final movement.

29. A change-making machine comprising a series of coin holders, slidable coin ejectors associated with the respective holders, a plurality of longitudinally shiftable bars supporting the ejectors and having cam fingers, a movable carrier for the bars, a plurality of key-operated means actuating the carrier to operate the ejectors, said means also having connections with the ejectors to advance and retract the same, certain ones of said means being connected to a plurality of ejectors, a series of key-operated levers selectively engageable with the cam fingers for shifting the aforesaid bars on the carrier, an auxiliary slide bar on the carrier having an auxiliary coin ejector and cam fingers in the path of certain ones of the aforesaid key-operated levers, means on the auxiliary slide bar and a mechanism controlled thereby for rendering a group of the coin ejectors inoperative on an initial movement of said bar, a further movement of the bar restoring all but one of said group for operativeness and rendering another ejector inoperative, and also placing the auxiliary ejector in operative position to take the place of the ejector in the group which was left inoperative.

30. A change-making machine comprising a series of coin holders, slidable coin ejectors associated with the respective holders, a plurality of longitudinally shiftable bars supporting the ejectors and having cam fingers, a movable carrier for the bars, a plurality of key-operated means actuating the carrier to operate the ejectors, said means also having connections with the ejectors to advance and retract the same, certain ones of said means being connected to a plurality of ejectors, a series of key-operated levers selectively engageable with the cam fingers for shifting the aforesaid bars on the carrier, an auxiliary slide bar on the carrier having an auxiliary coin ejector and cam fingers in the path of certain ones of the aforesaid key-operated levers, means on the auxiliary slide bar and a mechanism controlled thereby for rendering a group of the coin ejectors inoperative on an initial movement of said bar, a further movement of the bar restoring all but one of said group for operativeness and rendering another ejector inoperative, and also placing the auxiliary ejector in operative position to take the place of the ejector in the group which was left inoperative, the key-operated levers for certain cam fingers of the auxiliary slide bar being adapted to impart to said bar its initial movement, and other key-operated levers engageable with other cam fingers of the auxiliary slide bar imparting the final movement.

31. In a change-making machine, a coin-ejector finger, a swinging support for the finger on which the latter is movable in the direction of its length for a working stroke, and also laterally into inoperative position, and means for swinging the support to give the advanced finger its working stroke, said means also advancing the finger, and means for shifting the finger laterally into inoperative position.

In testimony whereof I affix my signature.

EMIL G. JOHANSON.

Copies of this patent may be obtained for five cents each, by addressing the "Commissioner of Patents, Washington, D. C."